May 14, 1968     P. P. ZAPPONI     3,383,144

SELF-LUBRICATING URETHANE-UREA COPOLYMER BEARING

Filed March 12, 1965

*INVENTOR.*
PASCHAL P. ZAPPONI
BY
ATTORNEY

United States Patent Office 3,383,144
Patented May 14, 1968

3,383,144
SELF-LUBRICATING URETHANE-UREA
COPOLYMER BEARING
Paschal P. Zapponi, Cleveland, Ohio, assignor, by mesne assignments, to Clevite Corporation, a corporation of Ohio
Continuation-in-part of application Ser. No. 399,007, Sept. 24, 1964. This application Mar. 12, 1965, Ser. No. 442,571
19 Claims. (Cl. 308—36.1)

ABSTRACT OF THE DISCLOSURE

This invention comprises a new self-lubricated bearing and the process for preparing the bearing composition by reacting a polyurethane prepolymer having a molecular weight of 1000–5000 and free isocyanate groups therein with an amine compound having at least 2 primary amine groups, and simultaneously with 2–3.5% by weight, based on the weight of the polyurethane prepolymer, of a fatty acid having 16–26 carbon atoms, the polyurethane having free isocyanate groups in the proportion of 2–20% by weight of the polyurethane and the amine being used in an amount in the range of from 20% less to 20% in excess of the stoichiometric amount required to react with the free isocyanate radicals. It is found that the presence of the fatty acid during the reaction of the components ordinarily used to prepare a urethane-urea copolymer does not interfere with the polymerization reaction and actually imports permanent lubricity to the composition.

---

This invention relates to a self-lubricated urethane-urea copolymer bearing wherein the bearing not only has a lubricant within the bearing external to the copolymer component, but also a lubricant within the urethane-urea copolymer which makes the copolymer self-lubricating in the event of loss of external lubricant. More particularly, this invention relates to a bearing comprising a urethane-urea copolymer component containing a compound therein imparting lubricity and other improved properties. Still more particularly, this invention relates to a bearing capable of extended lubricity after loss of lubricant therefrom. Still more particularly, this invention relates to a urethane-urea copolymer bearing composition having a number of improved properties effected by the incorporation of stearic acid, palmitic acid, etc.

This application is a continuation-in-part of applicant's copending application Ser. No. 399,007, filed Sept. 24, 1964, now abandoned.

Rubber bearings and bushings are known which consist of two concentric spaced-apart metal sleeves with rubber or a rubber-like material positioned between the two sleeves in such a manner that relative rotary motion between the sleeves will cause shear in the rubber-like material.

Another bearing comprises a rigid housing member having a load-bearing face which is either the inner or outer face of the bearing, and a rubber-like material which has its load-bearing face in engagement with a load-bearing face of the housing member for load-bearing support therebetween. The two load-bearing faces, that is of the rubber-like material and the adjacent, supporting metal sleeve are lubricated by a permanent lubricant contained within the bearing. The term "permanent" is understood to mean that the bearing is not subject to periodic lubrication, i.e., no lubricant is added for the life of the bearing, and if the bearing eventually fails, it is replaced.

Drake Patent 3,133,769 describes such a bearing in which the load-bearing face of the rubber-like member is recessed, as by grooves, dimples, or the like, so that when the two load-bearing faces are together the recessed area is free from contact with the other member thereby defining a volume between the two load-bearing faces. This volume is substantially filled with permanent lubricating means for lubricating the engaging portions of the two load-bearing faces. Sealing means are at the edges of the two load-bearing faces to permanently seal the lubricating material between rubber-like member and the housing member.

The patent describes a bearing comprising an inner member and an outer member spaced from each other for relative motion therebetween. The rubber-like sleeve component is mounted between the inner and outer members and is secured to only one of these members to prevent rotary motion between the rubber-like sleeve and this one member. The lubricant of the permanent type is positioned between the rubber sleeve and the other member, with the recesses mentioned above being in the surface of the rubber sleeve adjacent to this other member. The patent illustrates various configurations of bearings and recesses in the load-bearing surface of the rubber sleeve. The various configurations and surface recesses described therein are suitable for present purposes and the descriptions therein are made a part of the description of the present invention. Typical load-bearing surfaces of the urethane-urea copolymer sleeve in the present invention are illustrated in the accompanying drawings, namely FIGS. 1–7.

In accordance with the practice of this invention, it has been found that urethane-urea copolymer bearing compositions for permanently lubricated bearings can be prepared by the addition of 2–5 percent of a fatty acid having 12–26 carbon atoms therein, such as stearic acid, palmitic acid, urucic acid, cerotic acid, oleic acid, lauric acid, etc., to a casting resin composition comprising a liquid polyurethane prepolymer, e.g., one having a molecular weight in the range of about 1,000–5,000, preferably about 2,000–3,000, having residual or unreacted isocyanate radicals therein, advantageously 2–10%, preferably about 6–6.5% by weight, and an amine curing agent having at least two primary amine groups, such as 4,4'-methylene bis-(2-chloroaniline), marketed under the trademark "Moca." The fatty acid is advantageously saturated and in any case has no more than one unsaturated group therein.

The stearic acid or related acid imparts to the resultant cross-linked urethane-urea copolymer resin, improved internal lubricity and extended lubricity with resultant markedly improved bearing performance. While acids, such as adipic acid have been known to reduce the demolding time, these are no better than the stearic and related acids are for this purpose. However, adipic acid imparts no internal lubricity.

Moreover, while stearic acid itself has been used as a lubricant to facilitate the working or milling of a thermoplastic polyurethane, the stearic acid is used in smaller amounts than in the present invention, and is added to a preformed thermoplastic polymer of substantial molecular weight, in fact millable gums.

For example, Schmidt et al. Patent No. 3,036,042 shows the addition of less than 1% stearic acid to millable thermoplastic polyurethane mixed on a milling machine. Since there is no reaction of isocyanate radicals being effected by the patentees after the addition of the stearic acid the stearic acid does not catalyze nor otherwise participate in forming the urethane structure of the polymer.

Actually the patentees are effecting crosslinking of the polymer by peroxide generation of free radicals to cross grafting between polymer molecules. In such cases the molecular weight of the polymer to which the stearic acid is added is of a much greater value, e.g., at least 100,000, than the liquid polymers of applicant's starting composition which are in the range of 1,000–5,000. Moreover, the proportions of polyhydric material used in patentee's preparation of the polymer is in considerable excess of the stoichiometric amount for reaction with the isocyanate groups. Therefore the resultant polymer has free hydroxyl groups instead of unreacted isocyanate groups.

In applicant's case, the low molecular weight liquid prepolymers used as the casting resin have free isocyanate groups and these are reacted with amine groups to build up the polymer chain. Therefore, the resultant polymer chain of applicant's invention is actually a combination of polyurethane linkages, i.e., —NHC(O)O—, and polyurea linkages, —NHC(O)NH—.

Consequently, in addition to starting with very low molecular weight prepolymers, applicant's ultimate composition has a urethane-urea copolymer structure with a substantial amount of the fatty acid embodied therein.

The liquid prepolymer used as a starting material in the practice of this invention is formed from an aromatic (Ar) diisocyanate and a dihydric compound. The reaction can be represented as follows:

OCN—Ar—NCO + R(OH)$_2$ ⟶

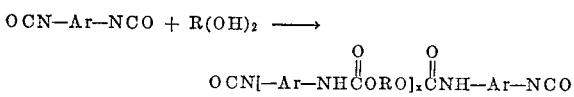

This product is found to be crosslinked between the linear chains and it is believed that this crosslinking is effected by isocyanate radicals reacting to a small degree to replace the second hydrogen from some of the amine radicals.

Typical diisocyanates that can be used in preparing the liquid prepolymers used in this invention include: 2,4-toluylene diisocyanate, 2,6-toluylene diisocyanate, p-phenylene diisocyanate, 4,4'-diphenylmethane diisocyanate, 1,5-naphthylene diisocyanate, dibenzidene diisocyanate, benzidene diisocyanate, 4,4'-diphenyl-diisocyanate, hexamethylene diisocyanate, tetramethylene diisocyanate, cyclohexylene diisocyanate, 4,4'-dicyclohexylmethane diisocyanate, etc. Toluylene diisocyanate is preferred.

The dihydric materials can have as the divalent R radical either aliphatic hydrocarbon radicals, or polyester radicals or polyalkylene ether radicals. For example, polyesters can be used as prepared by esterification of a dicarboxylic acid and a glycol, for example, from maleic anhydride and ethylene glycol, succinic anhydride and propylene glycol, phthalic anhydride and ethylene glycol etc. Polyalkylene ethers having terminal hydroxyl groups such as the polyethers prepared by condensation of an alkylene oxide such as ethylene oxide, propylene oxide, etc., for example, polyethylene glycol, polypropylene glycol, etc., can also be used.

Polyalkylene ethers are preferred in the practice of this invention. Typical ethers of this type which can be used include: polyethylene glycol, polypropylene glycols, polybutylene glycols, polyamylene glycols, etc.

Also preferred are glycols, such as 1,3-butylene glycol, 1,4-butylene glycol, hexamethylene glycol, pentamethylene glycol, ethylene glycol, 1,2-propylene glycol, trimethylene glycol, hydroquinone-beta-diethyl ether, quinitol, 4,4'-dihydroxydicyclohexyldimethyl-methane, 4,4'-dihydroxydicyclohexylmethane, etc.

Suitable polyesters include those disclosed in U.S. Patents Nos. 2,620,516 and 2,729,618. For example, polyesters formed by conventional thermal esterification methods of dihydric alcohols and dibasic organic acids can be used as the organic compound having the terminal hydroxyl groups. The alcohol component should be used in such amount as to produce a final product having an hydroxyl number within the range of from about 20 to about 80. Examples of suitable dicarboxylic acids include adipic acid, succinic acid, maleic acid, phthalic acid, and the like, preferably in the anhydride form. The dihydric alcohol may be ethylene glycol or other suitable glycol. A convenient method for carrying out the thermal esterification involves heating the reactants to a temperature of from about 110° C. to about 120° C. until water formed during the esterification is removed by distillation and then raising the temperature to from about 210° C. to about 220° C. under reduced pressure until esterification is completed. The resulting polyester having terminal hydroxyl groups is then dehydrated by maintaining it at a temperature of from about 110° C. to about 150° C. under a pressure less than atmospheric or while covered with an inert gas, such as nitrogen, until all of the moisture has been removed. The hydroxy polyester is prepared by thermal esterification using a molecular excess of glycol, for example, 12 moles of ethylene glycol and 11 moles of adipic acid, etc. The molecular weight of the polyester is increased or decreased by decreasing or increasing the molar excess of glycol.

Typical amines that can be used as chain extenders in providing the polyurea portion of the copolymer include: phenylene diamine, 4,4'-diaminodiphenyl, 4,4'-diaminodiphenylmethane, etc. Particularly preferred, however, is 4,4'-methylene-bis-(2-chloroaniline) because of its more easily controlled rate of reaction.

While diamines are generally used for this purpose, it is also possible to use triamines and thereby provide crosslinkages in the polyurea portion of the copolymer instead of the polyurethane portion of the linear polymer chain. In such case the crosslinkage is of the structure:

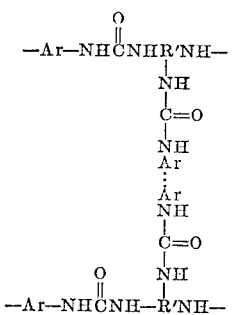

In the above formula for crosslinkages of the urea type, the three dots between the two Ar groups indicate that there are various types of connecting linkages between these Ar groups as are present in the original prepolymer.

Since the prepolymer used as the casting resin in the practice of this invention is liquid, it is necessary to use sufficiently low molecular weight materials such as the polyhydric compounds and the diisocyanates and to control the number of such compounds reacted per polymer molecule to give a sufficiently low molecular weight that the prepolymer will be a liquid.

A preferred polyether glycol is polytetramethylene glycol, which has the formula HO[—(CH$_2$)$_4$—O—]$_x$H where $x$ has a value of 2–60 depending on the number of urethane connecting linkages that are to be in the prepolymer. For example, for the prepolymer a higher molecular weight glycol can be reacted with a fewer number of diisocyanate molecules, for example to give a prepolymer of the formula:

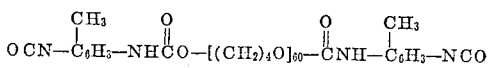

or a lower molecular weight glycol can be reacted with more diisocyanate to give the desired molecular weight in the prepolymer, for example:

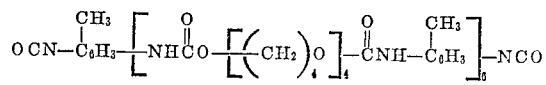

The invention is best illustrated by the following examples. These examples are intended merely for illustrative purposes and are not intended to restrict in any way, the scope of the invention or the manner in which it can be practiced. In these examples and throughout the specification, parts and percentages are given as parts and percentages by weight unless specifically indicated otherwise.

EXAMPLE I

A polyurethane prepolymer is prepared by reacting under anhydrous conditions 704 parts (2.3 moles) of a polytetramethylene glycol, having a molecular weight of 306, and 575 (3.3 moles) parts of toluylene diisocyanate to give a prepolymer having a molecular weight of about 1300 and a free isocyanate content of about 6.5%.

EXAMPLE II

The procedure of Example I is repeated using 1476 parts (2 moles) of a polytetramethylene glycol having a molecular weight of 738 and 522 parts (3 moles) of toluylene diisocyanate. The resultant prepolymer has approximately 4.1% free isocyanate groups and a molecular weight of about 2,050.

The various other dihydroxy materials indicated above can be similarly reacted using equivalent amounts respectively in place of the polytetramethylene glycol used in the preceding examples. Likewise, the various other diisocyanates indicated above can be substituted in equivalent amounts for the toluylene diisocyanate used in the preceding examples to give other prepolymers suitable for the practice of this invention.

EXAMPLE III

The prepolymer of Example I is mixed intimately under anhydrous conditions with 18.5% of 4,4'-methylene bis(2-chloroaniline) and 3% stearic acid based on the weight of prepolymer. The mixture is degassed by evacuation at 85° C. by reducing the pressure to 2–5 mm. of mercury for 20–30 minutes. This mixture is reacted in a closed mold for a bearing at a temperature of 100° C. for a period of 3 hours to give a urethane-urea copolymer containing stearic acid suitable for use in the self-lubricating bearing as described herein.

EXAMPLE IV

The procedure of Example III is repeated using the prepolymer of Example II and again a satisfactory copolymer is obtained for use in the bearings described herein.

EXAMPLE V

The procedure of Example III is repeated using in place of the prepolymer of Example I, a commercial product sold under the trademark "Adiprene L 167" which is a liquid polyurethane of the type described in Examples I and II having an isocyanate content of about 6.3%, a specific gravity at 75° F. of 1.06, a Brookfield viscosity at 85° F. of about 7000 c.p.s. and a Brookfield viscosity at 212° F. of about 300 c.p.s. The resultant urethane-urea copolymer is particularly suitable in preparing the bearing described herein.

EXAMPLE VI

The procedure of Examples I and III are repeated using an equivalent portion of naphthalene diisocyanate in place of the toluylene diisocyanate to prepare the prepolymer. Satisfactory results are obtained in preparing a urethane-urea copolymer which is used in preparing the bearing described herein and the same advantage of lubricity is noted in the resultant bearings. Likewise, similar satisfactory results are obtained when the various other diisocyanates listed above are substituted for the toluylene diisocyanate.

EXAMPLE VII

The procedures of Examples I and III are repeated except that in place of the polytetramethylene glycol used in preparing the prepolymer, there is used an equivalent weight of polyethylene glycol having a molecular weight of 750. The resultant copolymer is likewise suitable in preparing bearings of this invention having similar improved lubricity. Likewise, similar improved results are obtained when this procedure is repeated using in place of the polyethylene glycol, the various other glycols indicated above.

EXAMPLE VIII

The procedure of Example III is repeated using in place of the diamine used therein, 4,4'-diamino-diphenylmethane, phenylene diamine, 4,4-diamino-diphenyl and 1,5-diamino naphthalene, respectively. In each case, satisfactory results are obtained in producing a material capable of being used in the bearings in accordance with the practice of this invention to give a bearing of improved lubricity.

EXAMPLE IX

The procedure of Example III is repeated using individually in place of the stearic acid an equivalent amount of palmitic, oleic and urucic acid respectively to give similar improved results.

When Moca is used, the reaction temperature is preferably about 100° C. In general, however, a reaction or molding temperature of 90–130° C., preferably 100–120° C. can be used. The reaction is taken to a point where the resin will not be torn when removed from the mold. Additional setting or curing of the resin can be effected after removal from the mold. The desired degree of curing in the mold can be determined by measure of the Shore A hardness at the molding temperature by standard test. Advantageously the Shore A hardness at 100° C. is at least 50, preferably at least 60 before the resin is removed from the mold.

A number of experiments are performed according to the procedure of Example V with the variations in Moca and type and amount of acid indicated in Table A below. The results of a number of tests performed on the various copolymer products are also reported in the table.

(a) The tests are performed on a bearing similar to that shown in FIG. 25 of Drake Patent 3,133,769 except that splices 23 and rings 53 have the same radius and in the length of the bearing there are three full pockets, and one-half pocket at each end. The bearings are assembled with 0.000" interference. The metal sleeve on which the copolymer is slipped measures 2.1" in length and 1.02" I.D.

(b) Dry test:
   Oscillating angle _____ 3°
   Load _____lbs__ 200
   Oscillation rate _____c.p.m__ 280
   No end seals.

(c) Dry friction coefficient: Measured on Custom Scientific Instrument Frictionometer at 20 inches per second.

The above items (b) and (c) correlate to Dry Test (b) and Dry Friction Coefficient (c) in Table A.

It will be noted that when no acid is used the scope pattern, damage and dry friction coefficient each show unsatisfactory results. When adipic acid is used, even with microfine graphite and silicone oil, the results are likewise unsatisfactory. However, with stearic acid the tests show satisfactory results meaning that the bearing will continue to operate satisfactorily even after there is no more external lubricant.

TABLE A

| Composition (Parts per 100 parts of resin) | | | Dry Test (b) | | | Dry Friction |
|---|---|---|---|---|---|---|
| Amt. of Moca | Type Acid | Amt. Acid | Torque, lbs.-in. | | Scope Pattern | Damage | Coef. (c) |
| | | | Start | After 1 hr. | | | |
| 19.5 | | | 110 | 108 | S.S. | Minor debris | 0.35 |
| 16.0 | Stearic | 3.5 | 72 | 67 | V.S.S. | None | 0.21 |
| 19.5 | do | 3.5 | 75 | 71 | V.S.S. | do | 0.26 |
| 19.5 | Stearic | 2.0 | 94 | | V.S.S. | | |
| 19.5 | Adipic [1] | 0.9 | 109 | 107 | S.S. | Minor debris | 0.35 |
| 17.8 | Adipic [2] | 0.3 | 130 | 149 | S.S. | Considerable | |
| 17.8 | Erucic | 4.15 | 61 | 68 | C-V.S.S. | None | |
| 17.8 | Lauric | 2.45 | 65 | 93 | V.S.S. | do | |

[1] 5.0 parts Microfine graphite.
[2] 5.0 parts Microfine graphite and 3 parts of a silicone oil.
S.S. means scope pattern or sliding pattern of unsatisfactory operation.
V.S.S. means much better and satisfactory operation.
C-V.S.S. means very desirable pattern.

In the above example the 16 parts of Moca per 100 parts of resin represents 80% of the stoichiometric amount required for complete reaction with the available NCO groups in the resin, or 20% less than stoichiometric amount on the basis of the NCO group reacting with the $NH_2$ groups. The 19.5 parts of Moca represents 97.5% of the stoichiometric amount. This range is preferred but as little as 30% below and as much as 20% in excess of stoichiometric amount can be used. This range of 30% less than stoichiometric amount to 20% more than stoichiometric amount also applies satisfactorily to the other amines that can be used in place of the Moca.

The following example illustrates the improvement effected in resistance to set and other properties by the use of a certain amount of monomeric toluene diisocyanate together with prepolymer as compared to the use of only prepolymer as the isocyanate component. The difference in the amount of Moca used is the additional amount calculated to react with the additional isocyanate groups in the mixture containing the monomer.

EXAMPLE X

The procedure of Example V is repeated using as the prepolymer a commercial product sold under the trademark "Adiprene L-100" and having an isocyanate content of 4.1%. The proportions and results are shown in the following Table B.

TABLE B

| | Exp. A | Exp. B |
|---|---|---|
| Adiprene L-100 (Prepolymer), pts. | 100 | 100 |
| Toluene Diisocyanate (Monomer), pts. | | 5 |
| Moca, pts. | 11.0 | 18.8 |
| Stearic Acid, pts. | 3.5 | 3.5 |
| Properties of Product: | | |
| 100% Modulus, p.s.i. | 1,170 | 1,920 |
| 300% Modulus, p.s.i. | 1,940 | 2,780 |
| Tensile Strength, p.s.i. | 5,700 | 7,170 |
| Elongation, percent | 460 | 480 |
| Button Compression Test— | | |
| Pressure required to compress button stated percent (p.s.i.): | | |
| 5% | 118 | 190 |
| 10% | 220 | 315 |
| 15% | 325 | 485 |
| 20% | 468 | 672 |
| Compression Set Test: Deflected 20% (before and during 30 min. in oven at 212° F.), p.s.i. | [1] 468 | [1] 672 |
| Permanent set, percent | 24.4 | 22.4 |
| Deflected under same load (400 p.s.i.): Permanent set, percent | 7.00 | 4.4 |

[1] Required.

The urethane-urea copolymer structure produced in the practice of this invention can be represented by the formula:

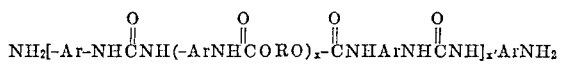

The "Ar" represents the aromatic nucleus present in the aromatic diisocyanate from which the polyurethane prepolymer is prepared, as well as the aromatic nucleus present in the diamine used in reacting the prepolymer to further polymerize and crosslink the linear polymer chains. $x$ has a value of at least 2, preferably at least 4, and $x'$ has a value of at least 1, preferably at least 2. As previously indicated, crosslinking is believed to occur between chains by the reaction of isocyanate groups to replace the second hydrogen on the urethane or urea radicals in the linear chain.

As indicated in the various diisocyanates and diamines listed above, the aromatic nucleus can be phenylene, naphthylene, toluylene, diphenylene, methylene diphenylene, methylene-dichlorodiphenylene, dichlorodiphenylene, dimethylene-diphenylene, ethylphenylene, chloronaphthylene, phenylene, phenyl phenylene, tolyl phenylene, cyclohexylene, etc. preferably of no more than 14 carbon atoms. In other words, the aromatic nucleus in addition to the two isocyanate radicals or the two amino radicals can have other substituents thereon such as chlorine or hydrocarbon groups, preferably of no more than about 7 carbon atoms, e.g., as alkyl, aryl and cycloalkyl.

Although aromatic nuclei are preferred in the diamines, diamines having an alkylene or cycloalkylene nucleus can also be used, preferably those having no more than 14 carbon atoms, for example, hexamethylene, cyclohexylene, petamethylene, methylcyclohexylene, etc. In such cases, the first and last "Ar" symbols in the above formula can be replaced by "Ar'" to represent the arylene, alkylene and cycloalkylene radicals.

The stearic acid, etc. can be added to the prepolymer along with the diamine. Since the diamines are generally also solid, the mixture can be melted by raising the temperature above the melting point of the two materials and the temperature lowered to the reaction temperature, if necessary, before addition to the prepolymer. In the case of the Moca-stearic acid combination, the mixture is melted at about 120° C., following which the temperature can be lowered to 100° C. without separation of solids. By maintaining the reaction temperature at approximately 100° C., the amine-acid reaction is minimized. Also to minimize this reaction, these components are mixed shortly before they are added to the prepolymer.

In addition to the improved lubricity of the copolymer casting, one of the chief advantages of the use of stearic acid and related acids is the very good demolding time effected by this acid. A 100° C. cure temperature is preferred to avoid the bubble problem that sometimes occurs at the higher temperature in the absence of compression forces.

An aspect of the invention lies in the provision of a permanently lubricated bearing which comprises a rigid housing member having a load-bearing face which is either its inner or its outer face, and a copolymeric urethane-urea material which has its load-bearing face in engagement with the load-bearing face of the housing member for load-bearing support therebetween. The load-bearing face of the copolymer member is recessed, as by grooves, dimples or the like, so that when the two load-bearing faces are together the recessed area is free from contact with the other member thereby defining a volume between the two load-bearing faces. Permanent lubricating means substantially fill this volume for permanently lubricating the engaging portions of the two load-bearing faces, and sealing means are at the edges of the load-bearing faces to permanently seal the lubricating material between the copolymer member and the housing member.

Another aspect of the invention lies in the provision of a bearing which comprises an inner member and an outer member spaced therefrom for relative motion therebetween. A copolymer sleeve is mounted between the inner and outer members and is secured to only one of the members to prevent rotary motion between the copolymer sleeve and the other member and sealing means are provided between the copolymer sleeve and the other member at each end of the bearing to prevent the egress of the lubricant and to prevent the ingress of dirt into the lubricant.

With reference to the drawing there is shown in FIG. 1 a longitudinal cross sectional view of a lubricated copolymer bearing in a typical mounting;

Figures 1, 2:
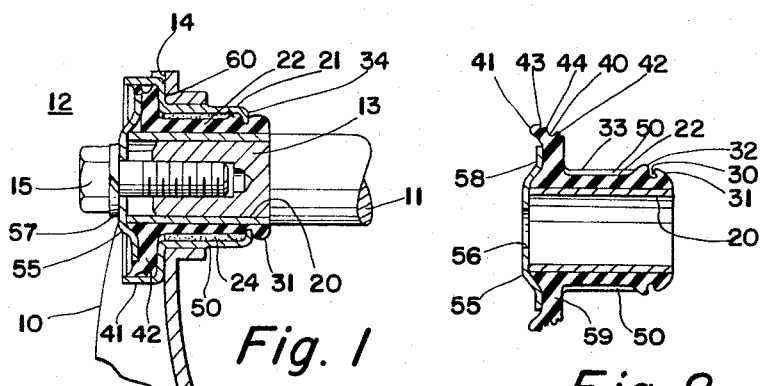
FIG. 2 is a sectional view of a portion of the unit with the outer metal tube removed.

The permanently lubricated copolymer bearing of the present invention is shown in FIG. 1 mounted to connect and form a pivotal joint between the upper control arm 10 and the control arm shaft 11 in a typical automotive suspension installation.

The bearing unit, identified by reference character 12, is hollow and fits around a reduced end portion 13 of the control arm shaft 11, and by a force fit is held in close engagement with a shoulder 14 of the upper control arm 10. The reduced end portion 13 of the control arm shaft 11 is bored and threaded, and a bolt 15 extends into the bearing unit 12 into threaded engagement with the control arm shaft 11, thereby locking the bearing unit in place.

The bearing unit 12 must be hollow for the application shown in the drawing, but for other applications this is not essential. As shown, the bearing is comprised of a hollow inner sleeve member 20 preferably formed of metal and a concentric hollow outer sleeve member 21 also preferably formed of metal. A copolymer sleeve 22 is mounted between the concentric metal sleeves 20, 21 and preferably is secured to only one of the sleeves to prevent relative rotary motion between the copolymer sleeve and the one metal sleeve to which it is secured. In the device shown, one face of the copolymer sleeve 22 is bonded or otherwise affixed to the inner metal sleeve 20, and rib portions 23, of the other face is in direct, lubricated, load-bearing engagement with the other metal sleeve 21.

A lubricant 24 is positioned between the O.D. of the copolymer sleeve 22 and the I.D. of the metal sleeve 21 to provide for permanently lubricating the area of contact between the copolymer sleeve 22 and the outer metal sleeve 21. Upon the application of a torsional force being applied to the outer sleeve 21 the built-in permanent lubricant causes the outer sleeve 21 to slip relative to the copolymer sleeve 22 with very low frictional resistance, and since there is substantially no distortion in the copolymer as the slippage takes place, there is substantially no spring force built up in the copolymer urging the unit to spring back to its original position. In other words, due to the lubrication and slippage the unit has substantially no torsional spring rate.

Sealing means are provided at each end of the bearing to prevent the escape of the permanent lubricant and to prevent dirt from working into the lubricated area. The sealing means shown in FIGS. 1–4 are located between the copolymer sleeve 22 and the outer metal sleeve 21, and there is one at each end of the unit. The sealing means at the right hand end of the unit is comprised of the annular groove 30, the upwardly and inwardly extending lip 31 at one side of the groove 30, and the bead 32 which extends around the unit above the level of the lubricated surface 33. The end 34 of the outer metal sleeve 21 turns inwardly into the groove 30 and the bead 32 is in close pressure contact with the inside surface of the sleeve 21, forming a pressure seal to retain the lubricant. The inwardly extending lip 31 engages the outer surface of the inwardly turned end 34 and establishes a seal which prevents the entry of dirt and which helps to prevent the escape of the lubricant. At the other end of the unit the sealing means comprise a groove 40, an upwardly extending lip 41 and a bead 42, as shown in FIG. 2. The lip 42 has two sharply pointed annular ridges, 43, 44 establishing point contact with the metal sleeve to increase local pressure between the copolymer sleeve 22 and metal sleeve 21 without establishing high frictional forces therebetween. When assembled, as shown in FIG. 1, the bead 42 is in close pressure engagement with the inside surface of a portion of the outer sleeve member 21, and the sharp annular ridges on the upwardly extending lip 41 are in resilient contact with the inside surface of the sleeve 21 establishing oil and dirt seals. Thus, the unit shown in FIGS. 1 and 2 has at each end a double seal.

To assure a supply of lubricant within the unit, a plurality of grooves 50 are provided around the circumference of the copolymer sleeve 22. When assembled, these grooves 50 contain a supply of lubricant, and as relative motion takes place between the outer metal sleeve 21 and the copolymer sleeve 22, the lubricant is continuously applied to a wide area of contact between the slipping parts.

The lubricant should not react chemically with the copolymer nor with the metal with which it comes in contact. Also, the lubricant should not be absorbed in the copolymer throughout the life of the bearing, and it should act as a proper lubricant throughout the range of ambient temperatures expected in service.

Examples of lubricants suitable for use with the copolymer are: silicone, Carbowax, castor oil and Ucon 50 HB.

"Carbowax" is a brand name for polyethylene glycol. "Ucon 50 HB" is a brand name for polyalkylene glycols and their derivatives.

The lubricant should be able to flow, that is, it should have no elastic limit. Materials such as nylon, Delrin, Teflon, etc., having elastic limits, are not suitable for the purposes of this invention, and are not lubricants within the meaning of the term as herein used.

The copolymer material should not absorb the lubricant, nor should it be porous because as the pores become stopped up with dirt adequate lubrication is lost.

A washer 55 having a bolt hole 56 is provided to facilitate assembly of the bearing unit between the control arm 10 and the control arm shaft 11. The washer 55 is concentric with the hollow sleeve 20 and the hole 56 accommodates the assembly bolt 15. A lock washer 57 may be used. The washer 55 has a flange portion 58 which extends radially outwardly and whose inner face is bonded to a flange portion 59 of the copolymer sleeve 22. Thus, the bearing unit as sold for automotive control arm use may comprise the copolymer sleeve 22, the inner and outer sleeves 20, 21 only one of which is bonded to the copolymer sleeve, and the end washer 55 bonded to the rubber.

For installation as shown in FIG. 1 it is required that the unit be able to resist axial thrust in one direction. This is achieved by the provision of the flange 59 in the copolymer sleeve 22, and by having a radially extending flange portion 60 in the outer metal sleeve 22. One face of the copolymer flange 59 lies against the flange 60 of the sleeve 21 and the other face against the washer 55. The O.D. of the washer 55 is appreciably greater than the I.D. of the flange 60 of the sleeve 22 so that there is established an overlap between the washer 55 and the flange 60. Axial motion between the washer 55 and the outer sleeve 22 tending to move them toward each other will be resisted by compression of the copolymer therebetween.

Figures 3, 4:
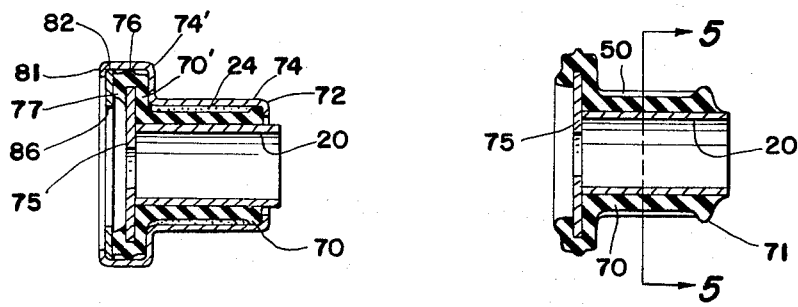
FIG. 3 is a longitudinal cross-sectional view of a modified form of the invention particularly adapted to resist thrust in two directions.
FIG. 4 is a sectional view of a portion of the unit shown in FIG. 3.

FIGS. 3 and 4 show a lubricated copolymer bearing adapted to take thrust in two directions. The copolymer sleeve member 70, shown in FIG. 4, terminates in a sealing bead 71, and when assembled, as shown in FIG. 3, the downwardly turned end 72 of the metal sleeve member 74 overlaps the bead 71 establishing the lubricant and dirt seal at one end of the unit. Only a single seal is shown at each end of this unit, but it is to be understood that a double seal, as shown in FIG. 1, could also be used.

At the opposite end of the unit a washer 75 is bonded to the copolymer member 70, and it extends radially outwardly, as previously explained, into an overlapping position with respect to the radial portion 74' of the outer metal sleeve 74, with a radial portion 70' of the copolymer member 70 positioned therebetween. The annular copolymer flange 70' has a peripheral portion 76 and has a reverse or reentrant portion 77 integral therewith extending radially inwardly toward the inner sleeve member 20. A thrust collar 30 is held against the outside face of the reentrant portion 77 by the outside sleeve member 74 which has an inwardly turned lip 61 having a notch 32 in its I.D. in which the collar 80 is positioned. Thrust in either direction between the inner and outer sleeves 20, 74 will be transmitted to the portion of the copolymer sleeve 70 on one side or the other of the washer 75.

Figures 5, 6:
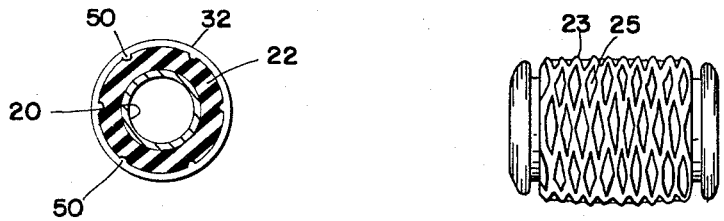
FIG. 5 is a sectional view taken along lines 5—5 of FIG. 4.
FIGS. 6 and 7 are side views showing modified type of lubricant retaining grooves.

In the device shown in FIG. 6 the copolymer member 52 has a plurality of valleys or grooves 25 on its outside surface, forming a plurality of lubricant retaining grooves to facilitate the even distribution of lubricant to the walls of the metal member with which it is to be assembled.

Figure 7:
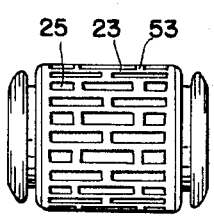

The device of FIG. 7 has pockets or short grooves running parallel to the linear axis of the copolymer sleeve.

The modifications of the invention shown in the figures of this specification are all sleeve bearings of one form or another. As illustrated, the copolymer member may be secured by friction or by bonding to one or the other of the metal members, but it is also within the scope of the present invention to have the copolymer member substantially free from tight engagement with both metal members so that relative motion takes place between the copolymer member and both metal members. Throughout the description of the sleeve bearings there has been shown and described scallops and grooves in the surface of the copolymer member which is to slip with respect to a metal member. It is to be understood that any other physical configuration which will cause the retention of lubricating material may be used. Thus the surface of the copolymer unit may contain a plurality of dimples, or it may have a number of raised areas between which the lubricating material may be stored.

When the copolymer sleeve is molded and before it is assembled between the inner and outer load-bearing metal members, its load-bearing rings or scallops 53 should be rounded, and its load-bearing axially extending ridges of ribs 23 also should be rounded. In the assembled device this assures the presence of lubricant between each of the load-bearing rings and ridges and the load bearing metal tube member during operation.

When the copolymer sleeve is assembled there is an interference fit between the rings and ridges and the metal tube member. The magnitude of this interference fit should be such that the total of the static load and the maximum dynamic load to be experienced by the unit does not cause any portion of the loadbearing rings or ridges to break away from its contacting tube member. In other words, it is important that all load bearing rings and ridges remain in engagement with the tubular member at all times. Load variation will change the area of the engagement between copolymer and tube, and this variation is depended upon to supply fresh lubricant to those portions of the copolymer which are in engagement with the tubular member. The ribs 23 restrict or prevent free circulation of the viscous lubricant around the sleeve member. This action is essential in installations where the bushing is apt to be unused over a period of time, as in an automobile which is not used for several months. In such applications it is important to have a large plurality of distributed relieved areas in the surface of the copolymer sleeve member, each area defining a pocket 25 to receive and hold viscous lubricant. As shown in FIGS. 6 and 7 various forms are recommended.

One of the major problems which has been mitigated by the herein described invention, especially in connection with automotive applications, is the problem of "stiction."

"Stiction" is the highly undesirable tendency of an unlubricated rubber-like member to stick to another member against which it is compressed with consequent high frictional forces involved in breaking the rubber-like member sleeve away from the metal sleeve. "Stiction" leads to early failure of rubber-to-metal bushings where relative motion is desired between rubber-like member surface and a metal surface.

To reduce or eliminate this "stiction," a large number of lubricant pockets 25 are distributed around the copolymer bushing and all of the load-bearing surfaces are (in their unloaded state) rounded to facilitate lubricant reaching the load-bearing areas of the rings 53 and ridges or ribs 23. Even after assembly, it is advisable that the loaded ribs and rings retain a small amount of the rounded aspect.

Another factor which is important to the reduction or elimination of "stiction" is the stiffness of the copolymer. The stiffer the copolymer, the faster the break-away with consequent better lubrication and less "stiction." However, the stiffness of the copolymer in the rings and ribs must be correlated to the thickness of the copolymer which forms the bottom of the pockets in order to prevent the copolymer in the rings and ribs from flowing under load into the pockets to the extent that it drives out the lubricant. The thinner the copolymer forming the bottom of the pockets, the harder it is for the ring and rib copolymer to flow into the pockets and drive out the lubricant. Also, it has been determined that it is preferable to have the bottoms of the pockets as thin as possible because the thinner the copolymer, the quicker the break-away. With these general directions, one can design an inexpensive substantially permanent, sealed, copolymer-to-metal bearing which exhibits long life, low friction and low spring rate.

While certain features of this invention have been described in detail with respect to various embodiments thereof, it will, of course, be apparent that other modifi-

The invention claimed is:

1. The process for preparing an improved urethane-urea copolymer bearing composition comprising the steps of reacting at a temperature of 90–130° C.:
   (a) a polyurethane having a molecular weight in the range of 1,000–5,000 having free isocyanate groups therein in a proportion of 2–10% by weight of the polyurethane, said polyurethane comprising the reation product of an aromatic diisocyanate and a dihydric compound, the diisocyanate compound being used in excess so as to provide unreacted isocyanate groups,
   (b) an amine compound having at least two primary amine groups, the amount of said amine compound being in the range of from 30% less than to 20% in excess of the amount stoichiometrically required to react with the amount of free isocyanate radicals in said polyurethane, and
   (c) 2–5% by weight based on the weight of said polyurethane of a fatty acid having 12–26 carbon atoms and having no more unsaturation therein than one ethylenic unsaturated group and continuing said reaction until a urethane-urea copolymer has been obtained having a Shore A hardness of at least 50 measured at 100° C.

2. The process of claim 1 in which said dihydric compound is a dihydroxy polyether.

3. The process of claim 1 in which said dihydric compound is a dihydroxy polyester.

4. The process of claim 1 in which said dihydric compound is a dihydroxy hydrocarbon compound.

5. The process of claim 1 in which said dihydric compound is dihydroxy polytetramethylene ether.

6. The process of claim 5 in which said diisocyanate is naphthylene diisocyanate.

7. The process of claim 5 in which said diisocyanate is phenylene diisocyanate.

8. The process of claim 5 in which the diisocyanate is toluylene diisocyanate.

9. The process of claim 5 in which said amine is 4,4'-methylene-bis-(2-chloroaniline).

10. The process of claim 8 in which said amine is 4,4'-methylene-bis-(2-chloroaniline).

11. The process of claim 10 in which said fatty acid is stearic acid.

12. The process of claim 10 in which said fatty acid is palmitic acid.

13. The process of claim 1 in which said amine compound is 4,4'-methylene-bis-(2-chloroaniline) used in an amount of 16–19.5 parts by weight per 100 parts by weight of said polyurethane, said acid is stearic acid, said temperature is 100–120° C. and said Shore A hardness at 100° C. is at least 60.

14. The product made by the process of claim 1 having a Shore A hardness measured at 100° C. of at least 50.

15. A bearing for rotary motion comprising an inner member,
   an outer member around said inner member and spaced therefrom, bushing means comprising a self-lubricating urethane-urea copolymer compressed between said inner and outer members for transmitting load from one of said members to the other, said resilient bushing means having on one major face thereof a plurality of rounded loadbearing ribs integral therewith, said rounded ribs being in direct loadbearing engagement with one of said members for lubricated sliding motion in respect thereto during said rotary motion and each space between said ribs defining a lubricant receiving pocket, lubricant pocket sealing means integral with said resilient bushing means and located within the confines of said members and in sealing engagement with said one of said members whereby lubricant within each of the pockets is substantially permanently retained within said pocket, viscous lubricant located in said pockets between said ribs whereby there is no wiping action which substantially completely removes lubricant from said lubricated surface, said self-lubricating urethane-urea copolymer comprising a copolymer produced by the process of claim 1.

16. A bearing of claim 15 in which said copolymer is a copolymer produced by the process of claim 11.

17. A bearing as set forth in claim 15, further characterized by said bushing means forming an open ended sleeve coaxially around said inner member.

18. A bearing as set forth in claim 17, further characterized by loadbearing rings integral with said rounded ribs, said rings extending circumferentially around said bushing and together with said ribs forming a plurality of closed lubricant receiving pockets axially of said bushing and forming a plurality of closed lubricant receiving pockets circumferentially around said bushing.

19. A bearing as set forth in claim 18, further characterized by said pocket sealing means, comprising loadbearing ring means extending circumferentially around said bushing means at both ends thereof.

References Cited

UNITED STATES PATENTS

| | | | |
|---|---|---|---|
| 2,729,618 | 1/1956 | Muller et al. | 260—22 |
| 2,844,554 | 7/1958 | Nichols et al. | 260—22 |
| 2,953,539 | 9/1960 | Keplinger et al. | 260—18 |
| 3,004,939 | 10/1961 | Varvaro | 260—18 |
| 3,015,636 | 1/1962 | Elmer | 260—18 |
| 3,036,042 | 5/1962 | Schmidt et al. | 260—77.5 |
| 3,133,769 | 5/1964 | Drake | 308—36.1 |
| 3,179,625 | 4/1965 | Ehrhart | 260—75 |

FOREIGN PATENTS 1,044,532  11/1958  Germany.

DONALD E. CZAJA, *Primary Examiner.*

R. W. GRIFFIN, *Assistant Examiner.*